United States Patent
Shen et al.

(10) Patent No.: US 11,927,799 B2
(45) Date of Patent: Mar. 12, 2024

(54) DATA TRANSMISSION SYSTEM AND DATA TRANSMISSION METHOD

(71) Applicant: AuthenX Inc., Hsinchu County (TW)

(72) Inventors: Po-Kuan Shen, Hsinchu County (TW); Chun-Chiang Yen, Hsinchu County (TW); Chiu-Lin Yu, Hsinchu County (TW); Kai-Lun Han, Hsinchu County (TW); Jenq-Yang Chang, Hsinchu County (TW); Mao-Jen Wu, Hsinchu County (TW); Chao-Chieh Hsu, Hsinchu County (TW)

(*) Notice: Subject to any disclaimer, the term of this patent is extended or adjusted under 35 U.S.C. 154(b) by 396 days.

(21) Appl. No.: 17/138,941

(22) Filed: Dec. 31, 2020

(65) Prior Publication Data

US 2022/0206216 A1 Jun. 30, 2022

(51) Int. Cl.
  *G02B 6/12* (2006.01)
  *G02B 6/122* (2006.01)
  *H01Q 1/38* (2006.01)
  *H01Q 9/04* (2006.01)

(52) U.S. Cl.
  CPC ............ *G02B 6/122* (2013.01); *H01Q 1/38* (2013.01); *H01Q 9/045* (2013.01); *G02B 2006/12147* (2013.01); *G02B 2006/12152* (2013.01)

(58) Field of Classification Search
  CPC .......... G02B 6/122; G02B 2006/12147; G02B 2006/12152; H01Q 1/38; H01Q 1/045
  USPC ......................................................... 385/14
  See application file for complete search history.

(56) References Cited

U.S. PATENT DOCUMENTS

| | | |
|---|---|---|
| 6,252,551 B1* | 6/2001 | Noro .......... H01Q 23/00 327/407 |
| 7,627,204 B1 | 12/2009 | Deane |
| 8,588,558 B2 | 11/2013 | Vernooy et al. |
| 8,706,049 B2 | 4/2014 | Choudhury et al. |
| 9,059,490 B2 | 6/2015 | DeVries et al. |
| 9,176,277 B2 | 11/2015 | Suh et al. |
| 9,219,598 B2 | 12/2015 | Blon et al. |
| 9,496,617 B2 | 11/2016 | Ganchrow et al. |
| 10,135,149 B2 | 11/2018 | Zhou |
| 10,153,556 B2 | 12/2018 | Ganchrow et al. |
| 2019/0190609 A1 | 6/2019 | Fernando |
| 2021/0175635 A1* | 6/2021 | Brobston .......... H01Q 1/523 |

FOREIGN PATENT DOCUMENTS

| | | |
|---|---|---|
| JP | H06281831 A | 10/1994 |
| KR | 20060121607 A | 11/2006 |

* cited by examiner

*Primary Examiner* — Jerry M Blevins

(57) ABSTRACT

A data transmission system is disclosed. The data transmission system includes at least one signal processing device, at least one conversion device, at least one antenna device, and at least one flexible printed circuit board. The at least one signal processing device is configured to generate or receive at least one data. The at least one conversion device is configured to transform between the at least one data and an optical signal. The at least one antenna device is configured to obtain the at least one data according to the optical signal, and configured to receive or transmit the at least one data wirelessly. The at least one flexible printed circuit board includes at least one conductive layer and at least one optical waveguide layer. The at least one optical waveguide layer is configured to transmit the optical signal.

30 Claims, 16 Drawing Sheets

DATA TRANSMISSION SYSTEM AND DATA TRANSMISSION METHOD

BACKGROUND

Field of Invention

The present disclosure relates to a transmission system and a transmission method. More particularly, the present disclosure relates to a data transmission system for transmitting data through a flexible printed circuit (FPC), and a data transmission method.

Description of Related Art

With advent of 5th generation mobile networks (5G) era, mobile devices can receive and transmit huge data through 5G network. However, when huge data are transmitted in mobile devices, transmission by normal electrical signal paths cannot meet the need for transmitting huge data.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

The present disclosure provides a data transmission system. The data transmission system includes at least one signal processing device, at least one conversion device, at least one antenna device, and at least one flexible printed circuit board. The at least one signal processing device is configured to generate or receive at least one data. The at least one conversion device is configured to transform between the at least one data and an optical signal. The at least one antenna device is configured to obtain the at least one data according to the optical signal, and configured to receive or transmit the at least one data wirelessly. The at least one flexible printed circuit board includes at least one conductive layer and at least one optical waveguide layer. The at least one optical waveguide layer is configured to transmit the optical signal.

A data transmission method is provided. The data transmission method includes steps of: generating or receiving at least one data through at least one signal processing device; transforming between the at least one data and an optical signal through at least one conversion device; transmitting the optical signal through at least one optical waveguide layer of at least one flexible printed circuit board; transforming between the optical signal and the at least one data through the at least one conversion device; and receiving or transmitting the at least one data through the at least one antenna device wirelessly.

Therefore, based on the technical content of the present disclosure, the data transmission system and the data transmission method of the present disclosure adopt a flexible printed circuit to transmit signals with high speed so as to enhance data transmission speed, such that the transmission bandwidth can be increased, and the interference can be decreased. If the data transmission system and the data transmission method of the present disclosure are applied to electronical products, it will bring a fast/quick response experience to users.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
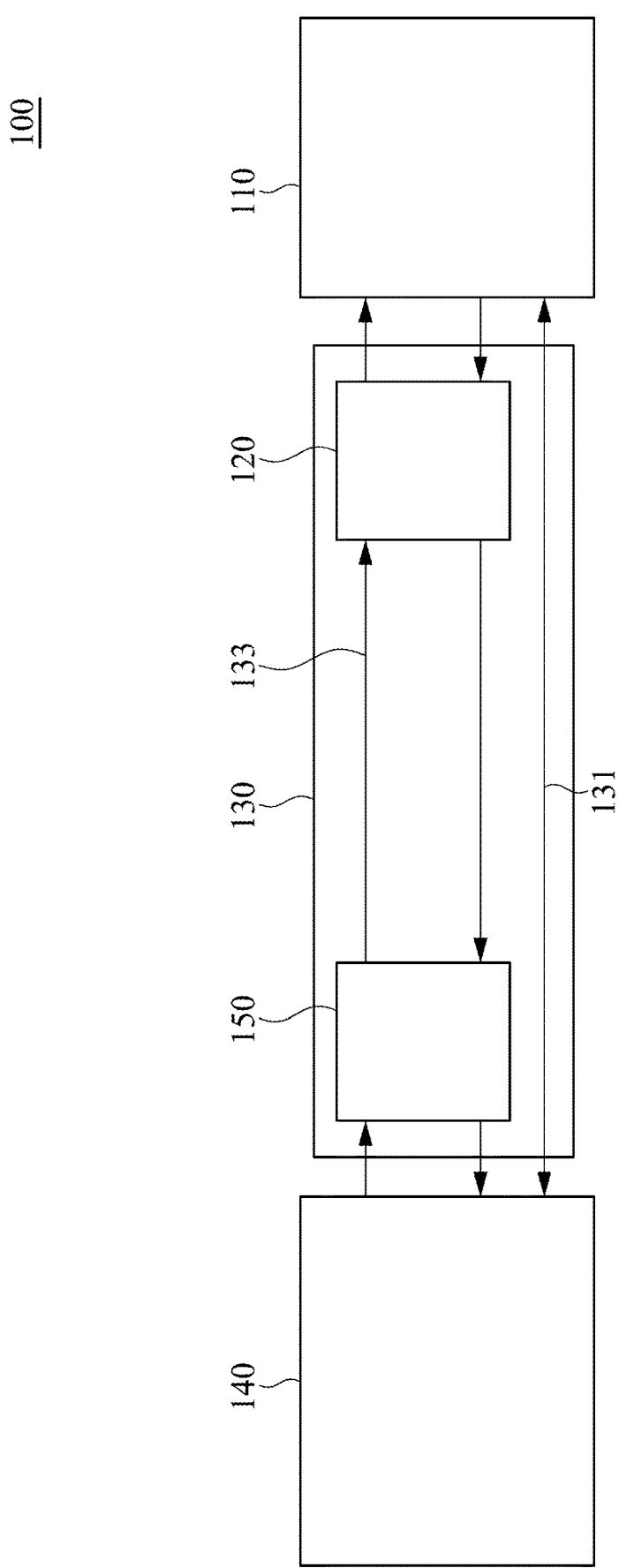
FIG. 1 depicts a schematic diagram of a data transmission system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts. However, the embodiments provided herein are intended as illustrative only since numerous modifications and variations therein will be apparent to those skilled in the art. Description of the operation does not intend to limit the operation sequence. Any structures resulting from recombination of elements with equivalent effects are within the scope of the present invention.

FIG. 1 depicts a schematic diagram of a data transmission system 100 according to one embodiment of the present disclosure. As shown in the figure, the data transmission system 100 includes an antenna device 110, a conversion device 120, a flexible printed circuit board 130, a signal processing device 140, and a conversion device 150. In addition, the flexible printed circuit board 130 includes a conductive layer 131 and an optical waveguide layer 133.

The operations of the data transmission system 100 will be described below. The signal processing device 140 generates data, and transmits the data to the conversion device 150. The conversion device 150 transforms the data into an optical signal. Subsequently, the conversion device 150 transmits the optical signal to the optical waveguide layer 133, and the optical waveguide layer 133 transmits the optical signal. Then, the conversion device 120 receives the optical signal, transforms the optical signal into the data, and transmits the data to the antenna device 110. The antenna device 110 transmits data wirelessly.

Compared with the conventional method of using a conductive layer to transmit data by means of electrical signals, the data transmission system 100 of the present disclosure adopts the optical signal to transmit data through the optical waveguide layer 133 of the flexible printed circuit 130. Therefore, the data transmission speed or the data transmission capacity of the data transmission system 100 of the present disclosure is increased substantially. As a result, complex data can be quickly transmitted between the signal processing device 140 and the antenna device 110 through the optical waveguide layer 133 of the flexible printed circuit board 130 so as to improve the entire transmission speed of the data. If the data transmission system 100 is applied to electronical products, it will bring a fast/quick response experience to users.

In one embodiment, the flexible printed circuit 130 can be a highly integrated OE-FPC (Optoelectronics Flexible Printed Circuit). OE-FPC can transmit electrical signals for controlling electrical elements, and transmit optical signals including carrier waves for carrying data. In another embodiment, the electrical signals can be transmitted to the conductive layer 131 from the antenna device 110, and the conductive layer 131 transmits it to the signal processing device 140. It is noted that, the electrical signals can be voltage control instructions (e.g., a DC voltage with 0.5V is regard as a voltage control instruction) or electrical control instructions carried by carrier waves (e.g., control instructions in connection with electricity, which are carried by AC carrier waves). In still another embodiment, the data can be electrical-related data (e.g., electrical signals) . . . etc. The conversion devices 120, 150 of the present disclosure may perform a conversion between electrical-related data (e.g., electrical signals) and optical signals. Then, the conversion devices 120, 150 transmit the optical signals converted from electrical-related data (e.g., electrical signals) to the optical waveguide layer 133, and the optical waveguide layer 133 transmits the optical signal. However, the present disclosure is not limited to the above-mentioned embodiments, and it is merely an example for illustrating one of the implements of the present disclosure. It will be apparent to those skilled in the art that various modifications and variations can be made to the structure of the present disclosure without departing from the scope or spirit of the present disclosure.

Figure 2:
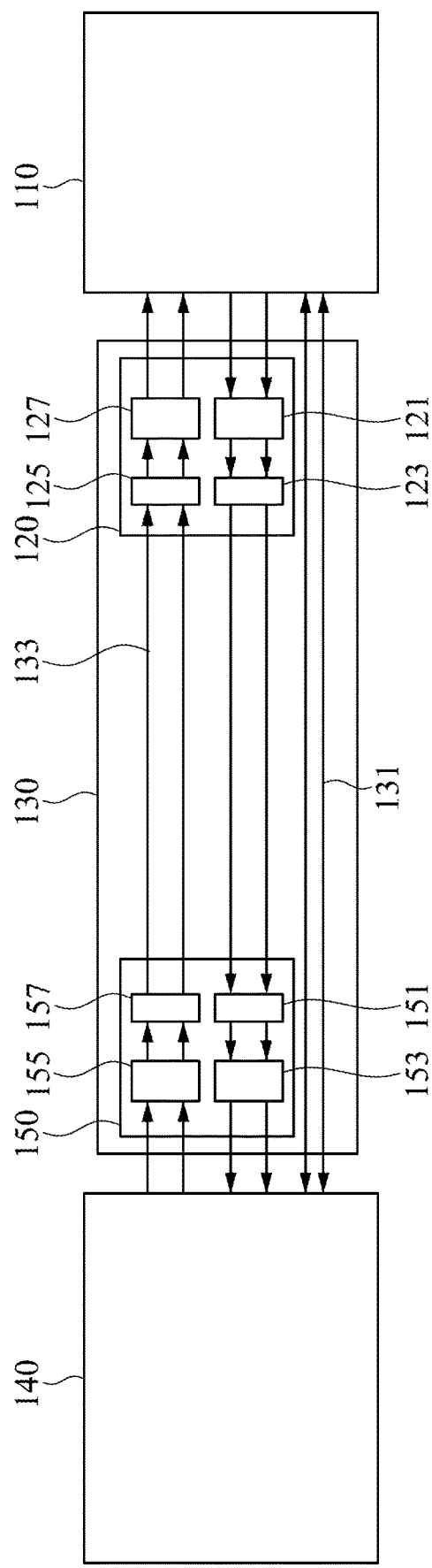
FIG. 2 depicts a schematic diagram of a data transmission system according to one embodiment of the present disclosure.

FIG. 2 depicts a schematic diagram of a data transmission system 100 according to one embodiment of the present disclosure. Referring to FIG. 1 and FIG. 2, FIG. 2 illustrates a detailed embodiment of the conversion devices 120, 150 in FIG. 1. As shown in the figure, the conversion device 120 includes a driver 121, a photoelectric converter 123, an optical detector 125, and an amplifier 127. In addition, the conversion device 150 includes an optical detector 151, an amplifier 153, a driver 155, and a photoelectric converter 157. In this embodiment, the operations of the data transmission system 100 will be described below. The signal processing device 140 generates data, and transmits the data to the driver 155 of the conversion device 150. The driver 155 of the conversion device 150 drives the photoelectric converter 157 to transform the data into an optical signal. Subsequently, the photoelectric converter 157 of the conversion device 150 transmits the optical signal to the optical waveguide layer 133, and the optical waveguide layer 133 transmits the optical signal. Then, the optical detector 125 of the conversion device 120 detects the optical signal, and transforms the optical signal into the data. The amplifier 127 of the conversion device 120 adjusts the data afterward, and transmits data to the antenna device 110. The antenna device 110 transmits the data wirelessly.

In addition, the data transmission system 100 of the present disclosure can perform a bidirectional transmission, which will be described below. The antenna device 110 receives data wirelessly, and transmits it to the driver 121 of the conversion device 120. The driver 121 of the conversion device 120 drives the photoelectric converter 123 to transform the data into an optical signal. Subsequently, the photoelectric converter 123 of the conversion device 120 transmits the optical signal to the optical waveguide layer 133, and the optical waveguide layer 133 transmits the optical signal. Then, the optical detector 151 of the conversion device 150 detects the optical signal, and transforms it into the data. The amplifier 153 of the conversion device 150 adjusts the data, and transmits it to the signal processing device 140. The signal processing device 140 performs subsequent data-related processing on the data.

In one embodiment, the driver 121 and the driver 155 can be semiconductor laser drivers (LD). The photoelectric converter 123 and the photoelectric converter 157 can be semiconductor lasers. The optical detector 125 and the optical detector 151 can be photodetectors (PD). However, the present disclosure is not limited to the above-mentioned embodiments, and it is merely an example for illustrating one of the implements of the present disclosure. It will be apparent to those skilled in the art that various modifications and variations can be made to the structure of the present disclosure without departing from the scope or spirit of the present disclosure.

Figure 3:
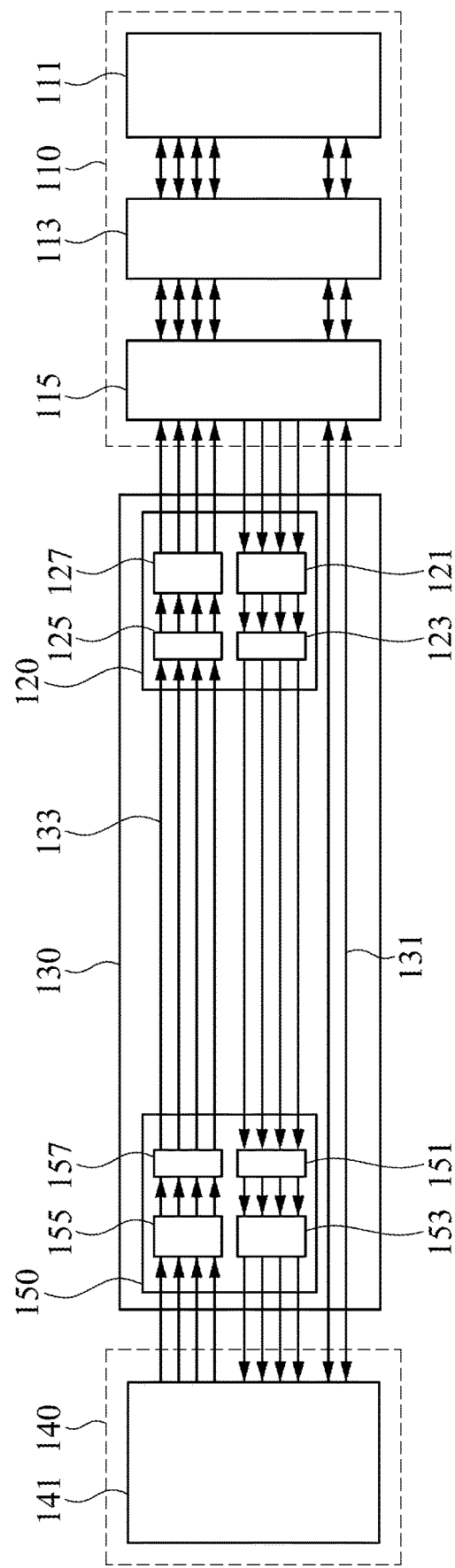
FIG. 3 depicts a schematic diagram of a data transmission system according to one embodiment of the present disclosure.

FIG. 3 depicts a schematic diagram of a data transmission system 100 according to one embodiment of the present disclosure. Referring to FIG. 2 and FIG. 3, FIG. 3 illustrates a detailed embodiment of the antenna device 110 and the signal processing device 140 in FIG. 2. As shown in FIG. 3, the signal processing device 140 includes a baseband processor 141, and the baseband processor 141 is configured to generate or receive data, and process the data. For example, the baseband processor 141 is configured to modulate or demodulate the data. In addition, the antenna device 110 includes an antenna 111, a front-end signal processor 113, and a wireless transceiver 115. The wireless transceiver 115 is configured to perform a RF signal processing to the data so as to generate the at least one data in a form of RF signal. The front-end signal processor 113 is configured to perform a front-end processing to the data in the form of RF signal. The antenna 111 is configured to receive or transmit the data in the form of RF signal wirelessly. For example, the wireless transceiver 115 is configured to transform between data and RF signal. The front-end signal processor 113 is configured to perform a front-end processing to the RF signal, and transmit the processed RF signal to the antenna 111. The antenna 111 receives or transmits RF signal wirelessly. In addition, the RF signal processing performed by the wireless transceiver 115 can be RF signal processing, converting, and digitization (and vice-versa). Besides, the front-end processing performed by the front-end signal processor 113 can be filtering data, amplifying data, transforming data, and so on. Furthermore, the flexible printed circuit board 130 is connected between the wireless transceiver 115 of the antenna device 110 and the baseband processor 141 of the signal processing device 140.

In one embodiment, for example, the baseband processor 141 is configured to generate intermediate frequency (IF) data or IQ data. The wireless transceiver 115 can be RF transceiver, and the RF transceiver is configured to transform IF data or IQ data into RF signal (e.g., millimeter wave). In practical, the wireless transceiver 115 can be single IC. The front-end signal processor 113 can be an integrated circuit including filters, amplifiers, data transformers, and elements that can perform the front-end processing. In practical, the front-end signal processor 113 can be single IC or an integrated circuit including multiple ICs. However, the present disclosure is not limited to the above-mentioned embodiments, and it is merely an example for illustrating one of the implements of the present disclosure. It will be apparent to those skilled in the art that other suitable elements can be used to implement the present disclosure without departing from the scope or spirit of the present disclosure.

Figure 4:
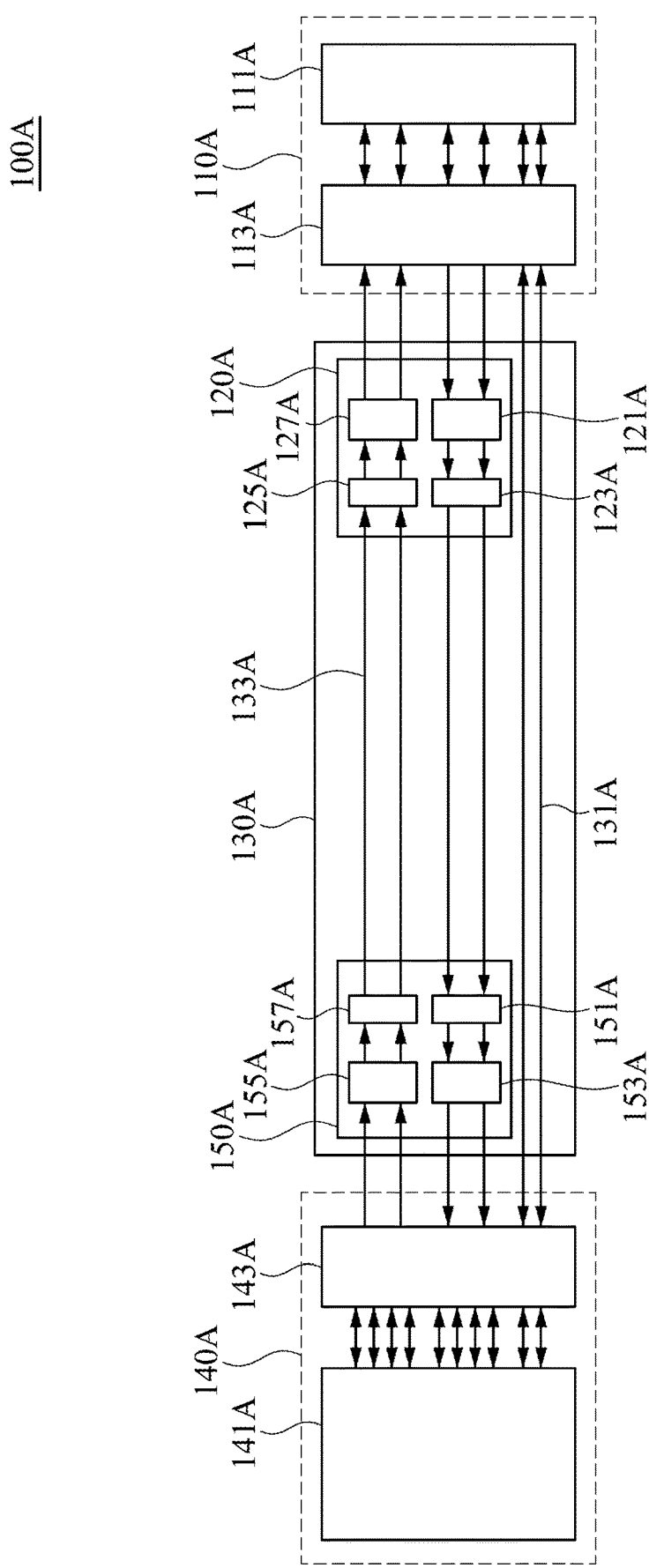
FIG. 4 depicts a schematic diagram of a data transmission system according to one embodiment of the present disclosure.

FIG. 4 depicts a schematic diagram of a data transmission system 100A according to one embodiment of the present disclosure. Compared with the data transmission system 100 shown in FIG. 3, the disposition of the antenna device 110A and the signal processing device 140A of the data transmission system 100A in FIG. 4 is different.

As shown in FIG. 4, the antenna device 110A includes a front-end signal processor 113A and an antenna 111A. The signal processing device 140A includes a baseband processor 141A and a wireless transceiver 143A. The baseband processor 141A is configured to generate or receive data, and the wireless transceiver 143A is configured to perform a RF signal processing to the data. The front-end signal processor 113A is configured to perform a front-end processing to the data. The antenna 111A is configured to receive or transmit the data wirelessly. Furthermore, the flexible printed circuit board 130A is connected between the front-end signal processor 113A of the antenna device 110A and the wireless transceiver 143A of the signal processing device 140A. It is noted that, the element in FIG. 4, whose symbol is similar to the symbol of the element in FIG. 3, has similar structure feature in connection with the element in FIG. 3. Therefore, a detail description regarding the structure feature of the element in FIG. 4 is omitted herein for the sake of brevity. Furthermore, the present disclosure is not limited to the structure as shown in FIG. 4, and it is merely an example for illustrating one of the implements of the present disclosure.

Figure 5:
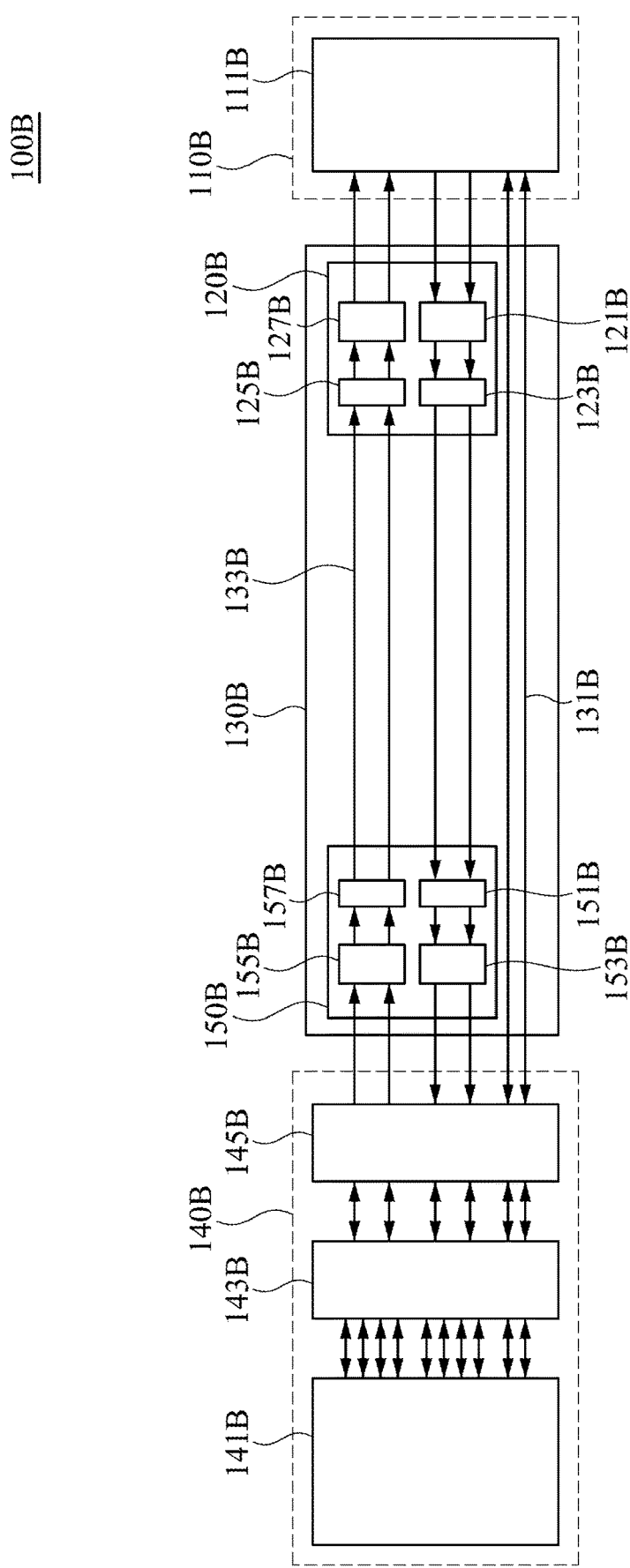
FIG. 5 depicts a schematic diagram of a data transmission system according to one embodiment of the present disclosure.

FIG. 5 depicts a schematic diagram of a data transmission system 100B according to one embodiment of the present disclosure. Compared with the data transmission system 100 shown in FIG. 3, the disposition of the antenna device 110B and the signal processing device 140B of the data transmission system 100B in FIG. 5 is different.

As shown in FIG. 5, the antenna device 110B includes an antenna 111B. The signal processing device 140B includes a baseband processor 141B, a wireless transceiver 143B, and a front-end signal processor 145B. The baseband processor 141B is configured to generate or receive data, and the wireless transceiver 143B is configured to perform a RF signal processing to the data. The front-end signal processor 145B is configured to perform a front-end processing to the data. The antenna 111B is configured to receive or transmit the data wirelessly. Furthermore, the flexible printed circuit board 130B is connected between the antenna 111B of the antenna device 110B and the front-end signal processor 145B of the signal processing device 140B. It is noted that, the element in FIG. 5, whose symbol is similar to the symbol of the element in FIG. 3, has similar structure feature in connection with the element in FIG. 3. Therefore, a detail description regarding the structure feature of the element in FIG. 5 is omitted herein for the sake of brevity. Furthermore, the present disclosure is not limited to the structure as shown in FIG. 5, and it is merely an example for illustrating one of the implements of the present disclosure.

As can be seen in FIG. 3 to FIG. 5, the flexible printed circuit board can be disposed between the baseband processor and the wireless transceiver, or disposed between the wireless transceiver and the front-end signal processor, or disposed between the front-end signal processor and the antenna between, depending on actual requirements.

Figure 6:
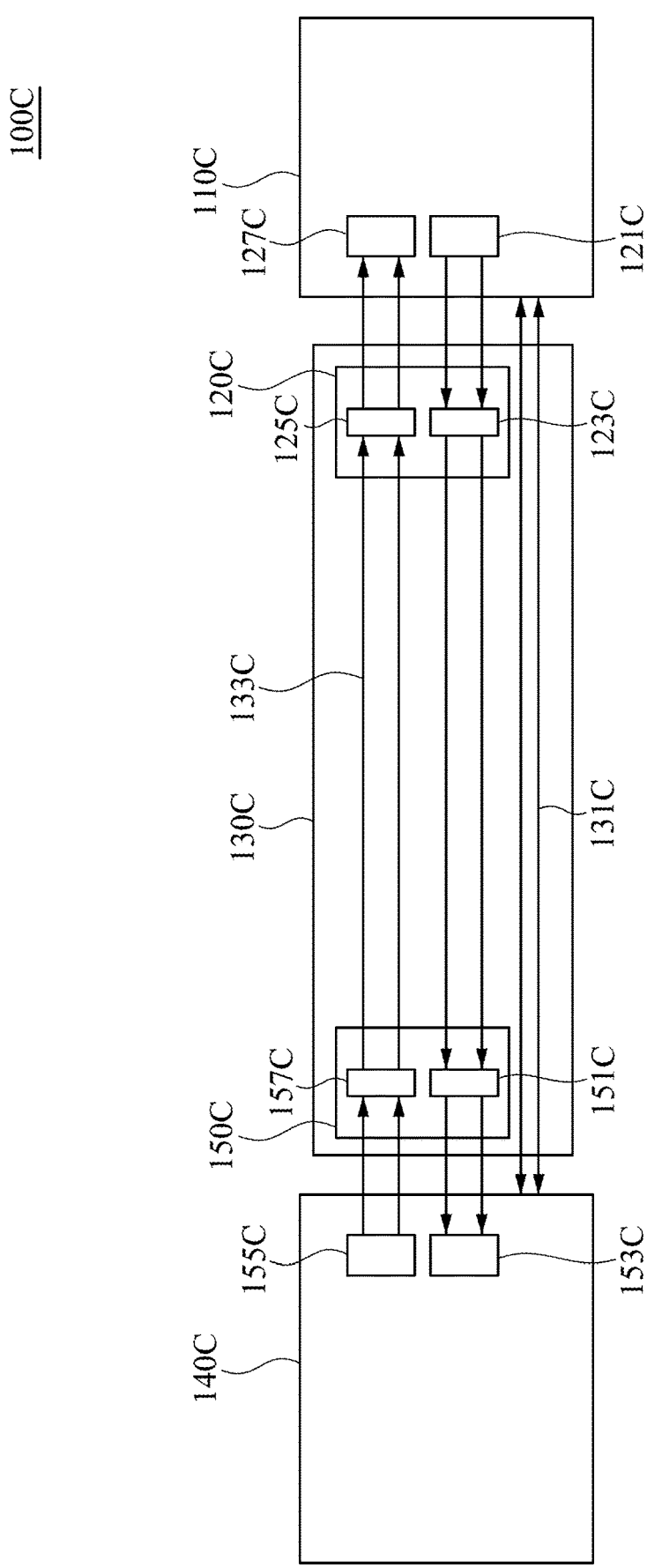
FIG. 6 depicts a schematic diagram of a data transmission system according to one embodiment of the present disclosure.
Figure 7:
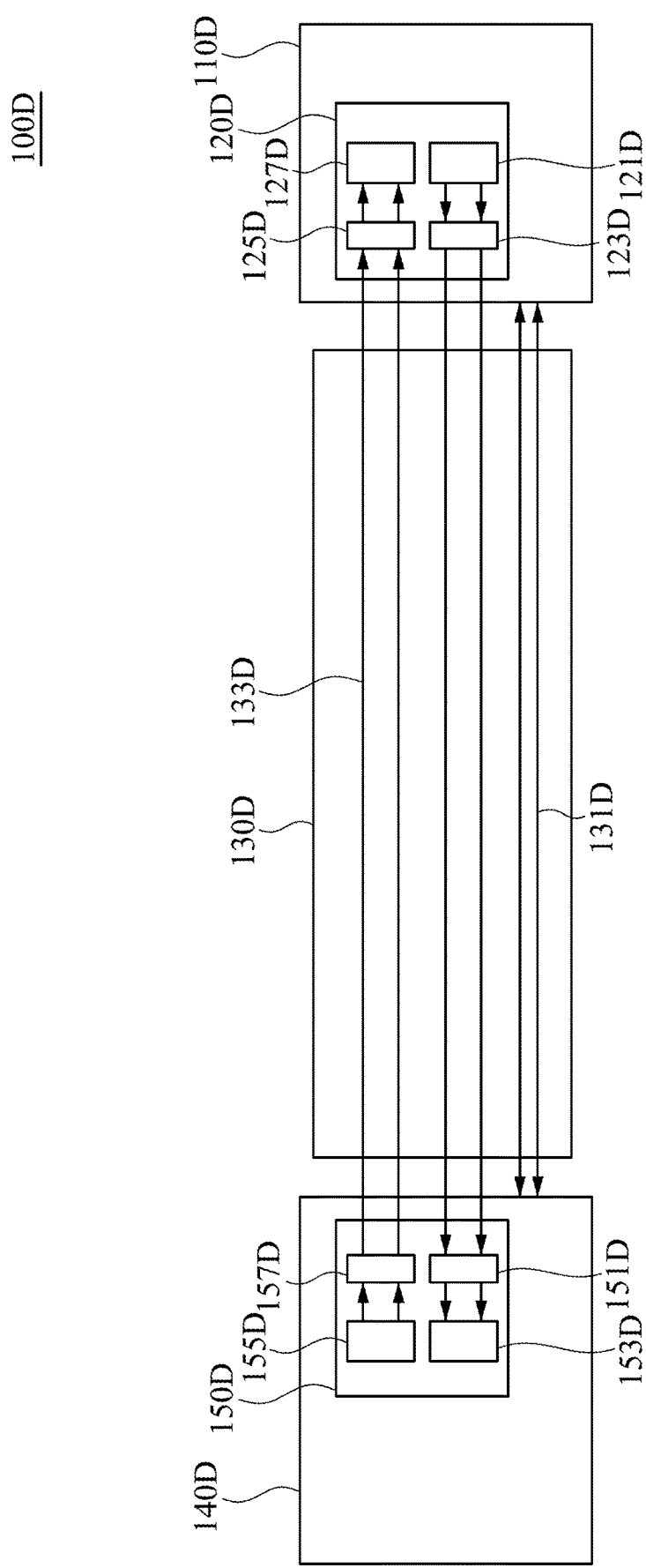
FIG. 7 depicts a schematic diagram of a data transmission system according to one embodiment of the present disclosure.

As can be seen in FIG. 1 to FIG. 5, the conversion devices 120, 120A, 120B, 150, 150A, 150B can be disposed on the flexible printed circuit boards 130, 130A, 130B. However, the present disclosure is not intended to be limited to the above-mentioned embodiment. Reference is now made to FIG. 6 and FIG. 7, the conversion devices 120C, 120D, 150C, 150D can be disposed in different ways. For example, as shown in FIG. 6, the photoelectric converter 123C and the optical detector 125C of the conversion device 120C can be disposed on the flexible printed circuit board 130C, and the driver 121C and the amplifier 127C of the conversion device 120C can be internally installed in the antenna device 110C. In addition, the optical detector 151C and the photoelectric converter 157C of the conversion device 150C can be disposed on the flexible printed circuit board 130C, and the amplifier 153C and the driver 155C of the conversion device 150C can be internally installed in the signal processing device 140C. It is noted that, the element in FIG. 6, whose symbol is similar to the symbol of the element in FIG. 2, has similar structure feature in connection with the element in FIG. 2. Therefore, a detail description regarding the structure feature of the element in FIG. 6 is omitted herein for the sake of brevity. Furthermore, the present disclosure is not limited to the structure as shown in FIG. 6, and it is merely an example for illustrating one of the implements of the present disclosure.

Referring to FIG. 7, in this embodiment, the conversion device 120D can be internally installed in the antenna device 110D, and the conversion device 150D can be internally installed in the signal processing device 140D. It is noted that, the element in FIG. 7, whose symbol is similar to the symbol of the element in FIG. 2, has similar structure feature in connection with the element in FIG. 2. Therefore, a detail description regarding the structure feature of the element in FIG. 7 is omitted herein for the sake of brevity. Furthermore, the present disclosure is not limited to the structure as shown in FIG. 7, and it is merely an example for illustrating one of the implements of the present disclosure.

Figure 8:
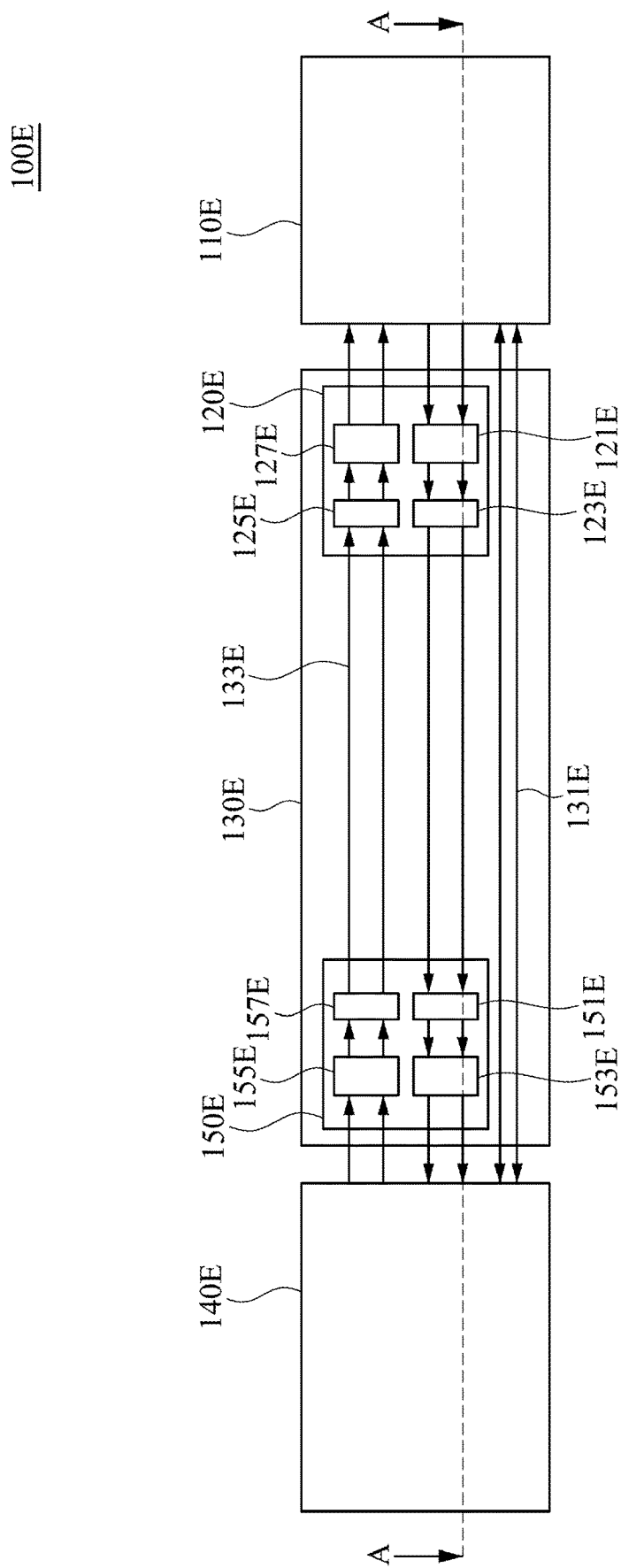
FIG. 8 depicts a schematic diagram of a data transmission system according to one embodiment of the present disclosure.

FIG. 8 depicts a schematic diagram of a data transmission system 100E according to one embodiment of the present disclosure. As shown in FIG. 8, the data transmission system 100E includes an antenna device 110E, a flexible printed circuit board 130E, and a signal processing device 140E. The antenna device 110E, the flexible printed circuit board 130E, and the signal processing device 140E can be disposed in different ways depending on actual requirements, which will be described below.

Figure 9:
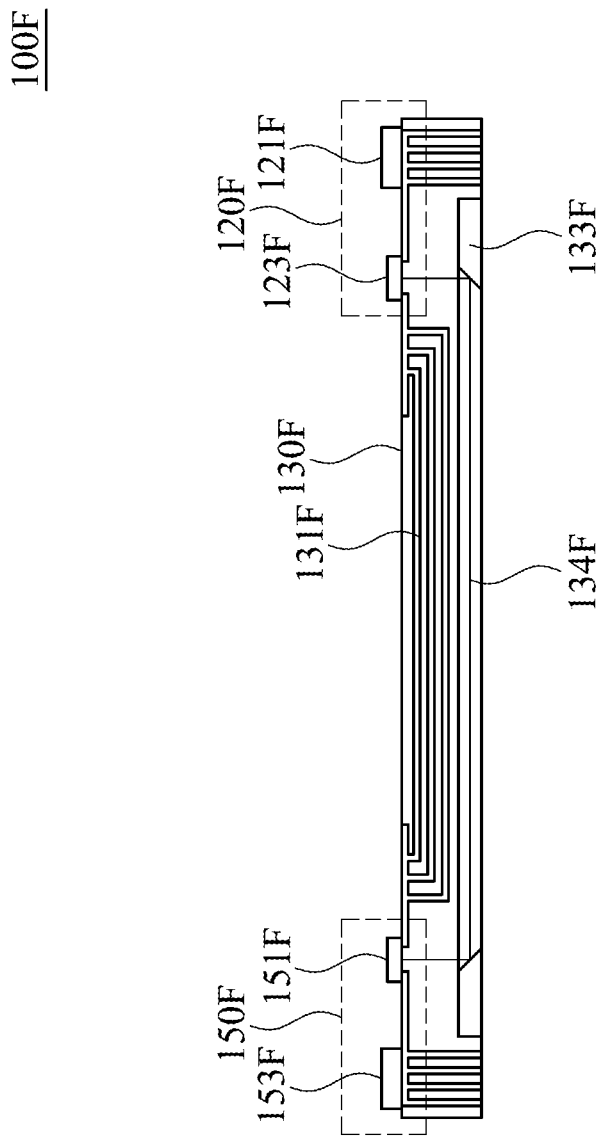
FIG. 9 depicts a schematic diagram of a cross-sectional view of the data transmission system shown in FIG. 8 according to one embodiment of the present disclosure.

First of all, for facilitating the understanding of the structure of the data transmission system 100E in FIG. 8, reference is now made to FIG. 9. FIG. 9 depicts a schematic diagram of a cross-sectional view along line AA' of the flexible printed circuit board 130E of the data transmission system 100E shown in FIG. 8 according to one embodiment of the present disclosure. As shown in FIG. 9, the flexible printed circuit board 130F includes a conductive layer 131F and an optical waveguide layer 133F. The optical signal 134F can be transmitted in the optical waveguide layer 133F. In addition, the conversion devices 120F and 150F can be disposed on the flexible printed circuit board 130F. It is noted that, the element in FIG. 9, whose symbol is similar to the symbol of the element in FIG. 2, has similar structure feature in connection with the element in FIG. 2. Therefore, a detail description regarding the structure feature of the element in FIG. 9 is omitted herein for the sake of brevity. Furthermore, the present disclosure is not limited to the structure as shown in FIG. 9, and it is merely an example for illustrating one of the implements of the present disclosure.

Figure 10:
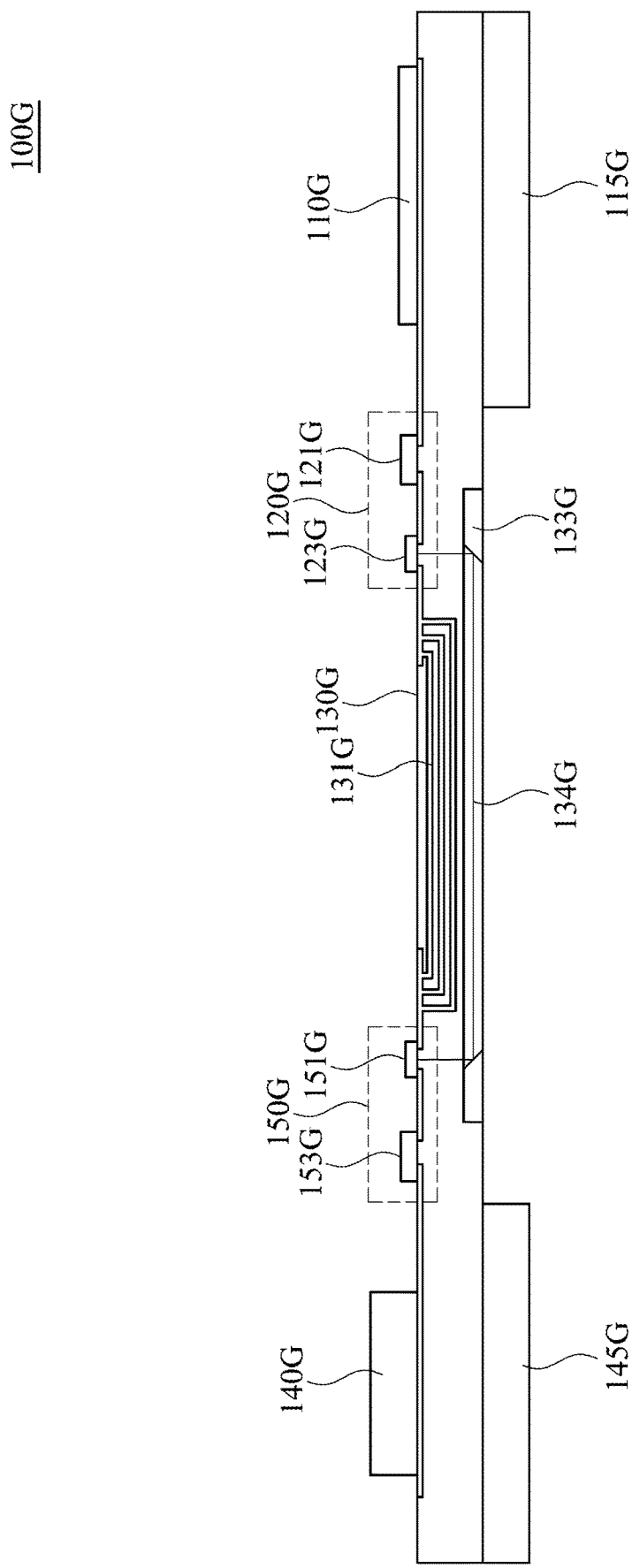
FIG. 10 depicts a schematic diagram of a cross-sectional view of the data transmission system shown in FIG. 8 according to one embodiment of the present disclosure.

In addition, in another structure disposition, for facilitating the understanding of the structure of the data transmission system 100E in FIG. 8, reference is now made to FIG. 10. FIG. 10 depicts a schematic diagram of a cross-sectional view along line AA' of the flexible printed circuit board 130E of the data transmission system 100E shown in FIG. 8 according to one embodiment of the present disclosure. As shown in FIG. 10, in this structure disposition, the antenna device 110G, the conversion devices 120G, 150G, and the signal processing device 140G are all disposed on the flexible printed circuit board 130G. In addition, the data transmission system 100G further includes a first support plate 115G and a second support plate 145G. The first support plate 115G is located below the flexible printed circuit board 130G, and configured to support the antenna device 110G. Furthermore, the second support plate 145G is located below the flexible printed circuit board 130G, and configured to support the signal processing device 140G. It is noted that, the element in FIG. 10, whose symbol is similar to the symbol of the element in FIG. 2, has similar structure feature in connection with the element in FIG. 2. Therefore, a detail description regarding the structure feature of the element in FIG. 10 is omitted herein for the sake of brevity. Furthermore, the present disclosure is not limited to the structure as shown in FIG. 10, and it is merely an example for illustrating one of the implements of the present disclosure.

Figure 11:
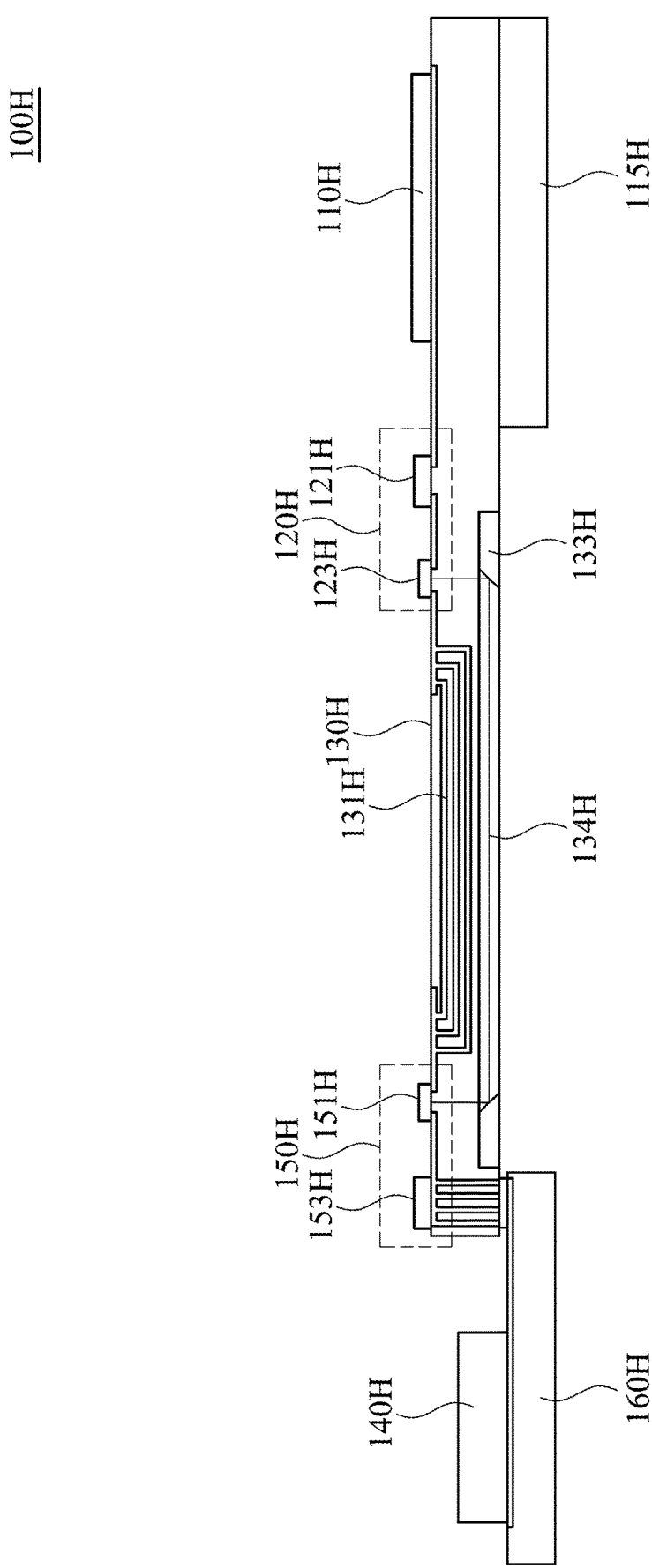
FIG. 11 depicts a schematic diagram of a cross-sectional view of the data transmission system shown in FIG. 8 according to one embodiment of the present disclosure.

Furthermore, in still another structure disposition, for facilitating the understanding of the structure of the data transmission system 100E in FIG. 8, reference is now made to FIG. 11. FIG. 11 depicts a schematic diagram of a cross-sectional view along line AA' of the flexible printed circuit board 130E of the data transmission system 100E shown in FIG. 8 according to one embodiment of the present disclosure. As shown in FIG. 11, in this structure disposition, the antenna device 110H and the conversion devices 120H, 150H are disposed on the flexible printed circuit board 130H. In addition, the data transmission system 100H further includes a support plate 115H and a substrate 160H. The support plate 115H is located below the flexible printed circuit board 130H, and configured to support the antenna device 110H. Furthermore, the substrate 160H is connected to the flexible printed circuit board 130H, and configured to dispose the signal processing device 140H. It is noted that, the element in FIG. 11, whose symbol is similar to the symbol of the element in FIG. 2, has similar structure feature in connection with the element in FIG. 2. Therefore, a detail description regarding the structure feature of the element in FIG. 11 is omitted herein for the sake of brevity. Furthermore, the present disclosure is not limited to the structure as shown in FIG. 11, and it is merely an example for illustrating one of the implements of the present disclosure.

Figure 12:
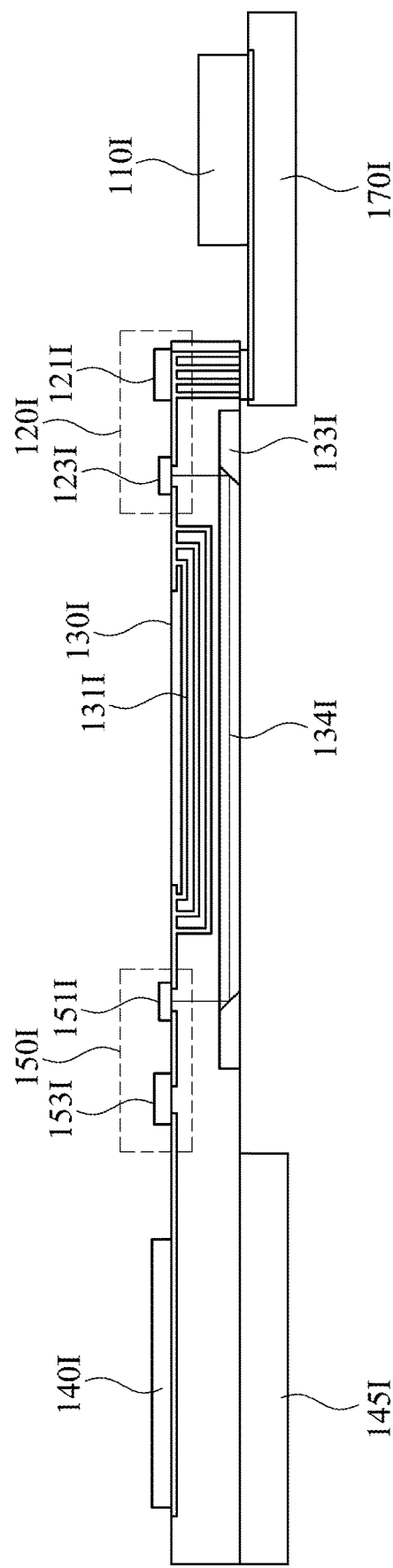
FIG. 12 depicts a schematic diagram of a cross-sectional view of the data transmission system shown in FIG. 8 according to one embodiment of the present disclosure.

Besides, in another structure disposition, for facilitating the understanding of the structure of the data transmission system 100E in FIG. 8, reference is now made to FIG. 12. FIG. 12 depicts a schematic diagram of a cross-sectional view along line AA' of the flexible printed circuit board 130E of the data transmission system 100E shown in FIG. 8 according to one embodiment of the present disclosure. As shown in FIG. 12, in this structure disposition, the conversion devices 120I, 150I and the signal processing device 140I are disposed on the flexible printed circuit board 130I. In addition, the data transmission system 100I further includes a substrate 170I and a support plate 145I. The substrate 170I is connected to the flexible printed circuit board 130I, and configured to dispose the antenna device 110I. Furthermore, the support plate 145I is located below the flexible printed circuit board 130I, and configured to support the signal processing device 140I. It is noted that, the element in FIG. 12, whose symbol is similar to the symbol of the element in FIG. 2, has similar structure feature in connection with the element in FIG. 2. Therefore, a detail description regarding the structure feature of the element in FIG. 12 is omitted herein for the sake of brevity. Furthermore, the present disclosure is not limited to the structure as shown in FIG. 12, and it is merely an example for illustrating one of the implements of the present disclosure.

Figure 13:
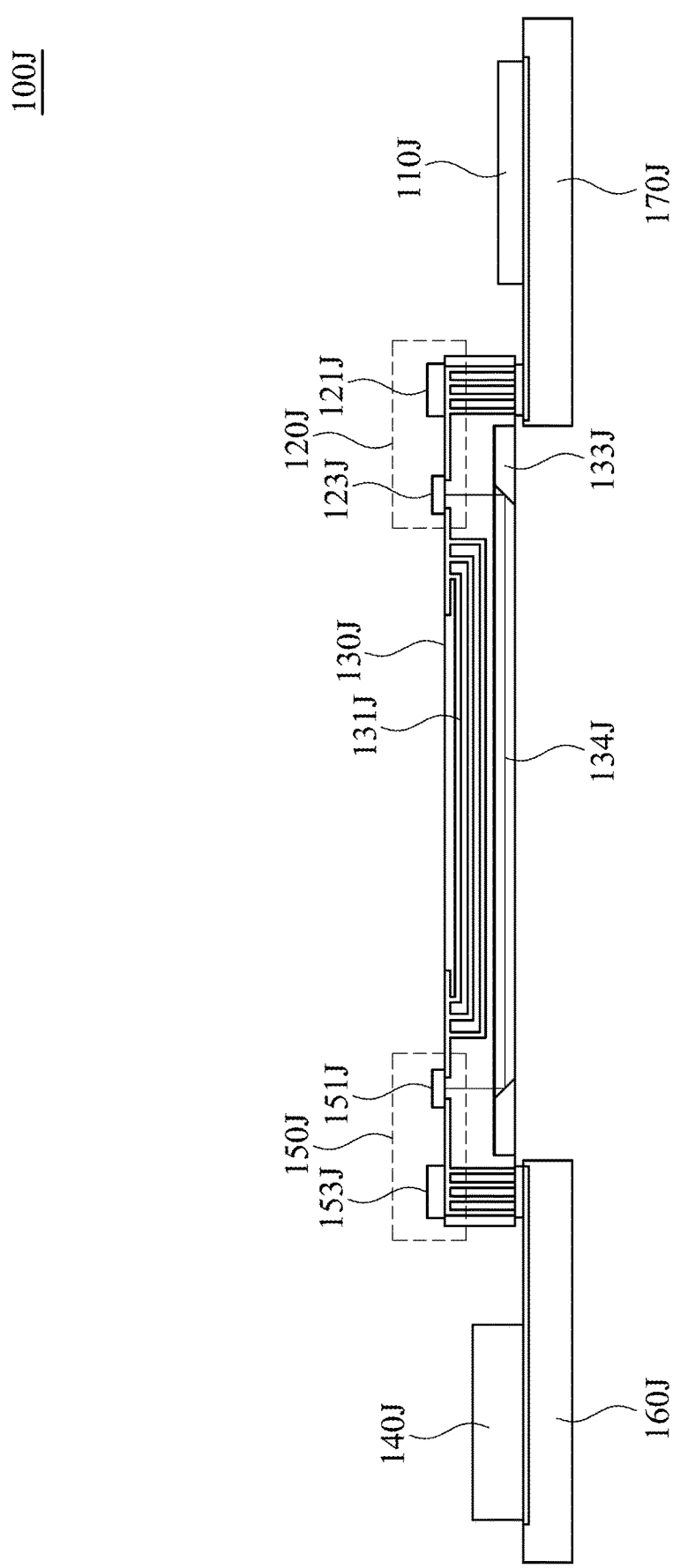
FIG. 13 depicts a schematic diagram of a cross-sectional view of the data transmission system shown in FIG. 8 according to one embodiment of the present disclosure.

In addition, in still another structure disposition, for facilitating the understanding of the structure of the data transmission system 100E in FIG. 8, reference is now made to FIG. 13. FIG. 13 depicts a schematic diagram of a cross-sectional view along line AA' of the flexible printed circuit board 130E of the data transmission system 100E shown in FIG. 8 according to one embodiment of the present disclosure. As shown in FIG. 13, in this structure disposition, the conversion devices 120J, 150J are disposed on the flexible printed circuit board 130J. In addition, the data transmission system 100J further includes a substrate 160J and a substrate 170J. The substrate 160J is connected to the flexible printed circuit board 130J, and configured to dispose the signal processing device 140J. Furthermore, the substrate 170J is connected to the flexible printed circuit board 130J, and configured to dispose the antenna device 110J. It is noted that, the element in FIG. 13, whose symbol is similar to the symbol of the element in FIG. 2, has similar structure feature in connection with the element in FIG. 2. Therefore, a detail description regarding the structure feature of the element in FIG. 13 is omitted herein for the sake of brevity. Furthermore, the present disclosure is not limited to the structure as shown in FIG. 13, and it is merely an example for illustrating one of the implements of the present disclosure.

In one embodiment, for example, the substrates 160H, 160J, 170I, 170J in FIG. 11 to FIG. 13 can be printed circuit boards (PCB). However, the present disclosure is not limited to the above-mentioned embodiments, and it is merely an example for illustrating one of the implements of the present disclosure. It will be apparent to those skilled in the art that other suitable elements can be used to implement the substrates of the present disclosure without departing from the scope or spirit of the present disclosure.

Figure 14:
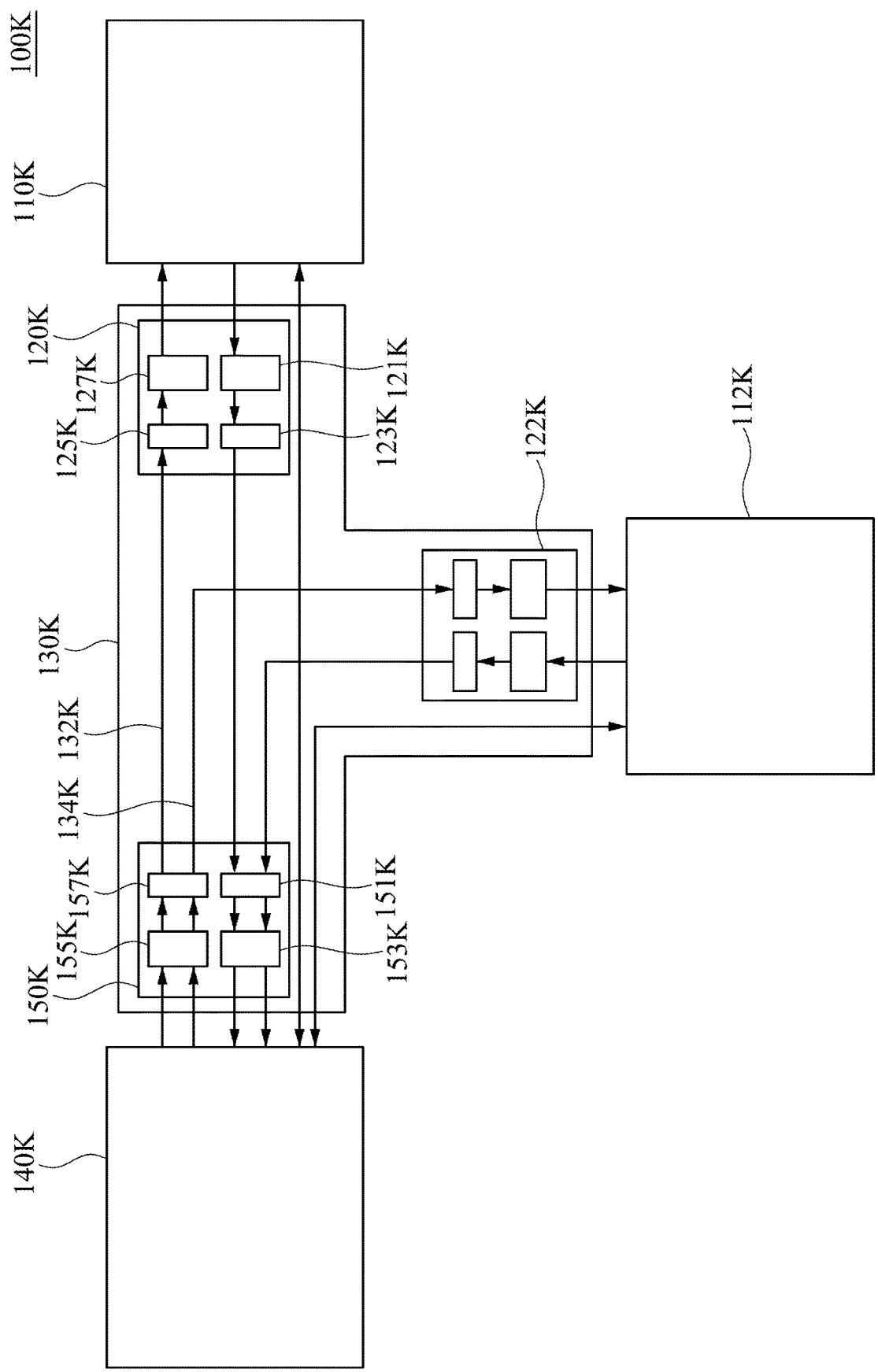
FIG. 14 depicts a schematic diagram of a data transmission system according to one embodiment of the present disclosure.

FIG. 14 depicts a schematic diagram of a data transmission system 100K according to one embodiment of the present disclosure. Compared with the data transmission system 100 shown in FIG. 2, the data transmission system 100K in FIG. 14 further includes an antenna device 112K and a conversion device 122K.

As shown in the figure, the antenna device 110K is connected to a first connecting terminal (e.g., the right terminal in the figure) of the flexible printed circuit board 130K, and the antenna device 112K is connected to a second connecting terminal (e.g., the lower terminal in the figure) of the flexible printed circuit board 130K. In addition, the signal processing device 140K is connected to a third connecting terminal (e.g., the left terminal in the figure) of the flexible printed circuit board 130K.

In one embodiment, the signal processing device 140K is coupled to the antenna device 110K through a first optical path 132K of the optical waveguide layer, and the signal processing device 140K is coupled to the antenna device 112K through a second optical path 134K of the optical waveguide layer. It is noted that, the data transmission system 100K of the present disclosure can perform a bidirectional transmission through the optical path of the optical waveguide layer. In addition, the element in FIG. 14, whose symbol is similar to the symbol of the element in FIG. 2, has similar structure feature in connection with the element in FIG. 2. Therefore, a detail description regarding the structure feature of the element in FIG. 14 is omitted herein for the sake of brevity. Furthermore, the present disclosure is not limited to the structure as shown in FIG. 14, and it is merely an example for illustrating one of the implements of the present disclosure.

Figure 15:
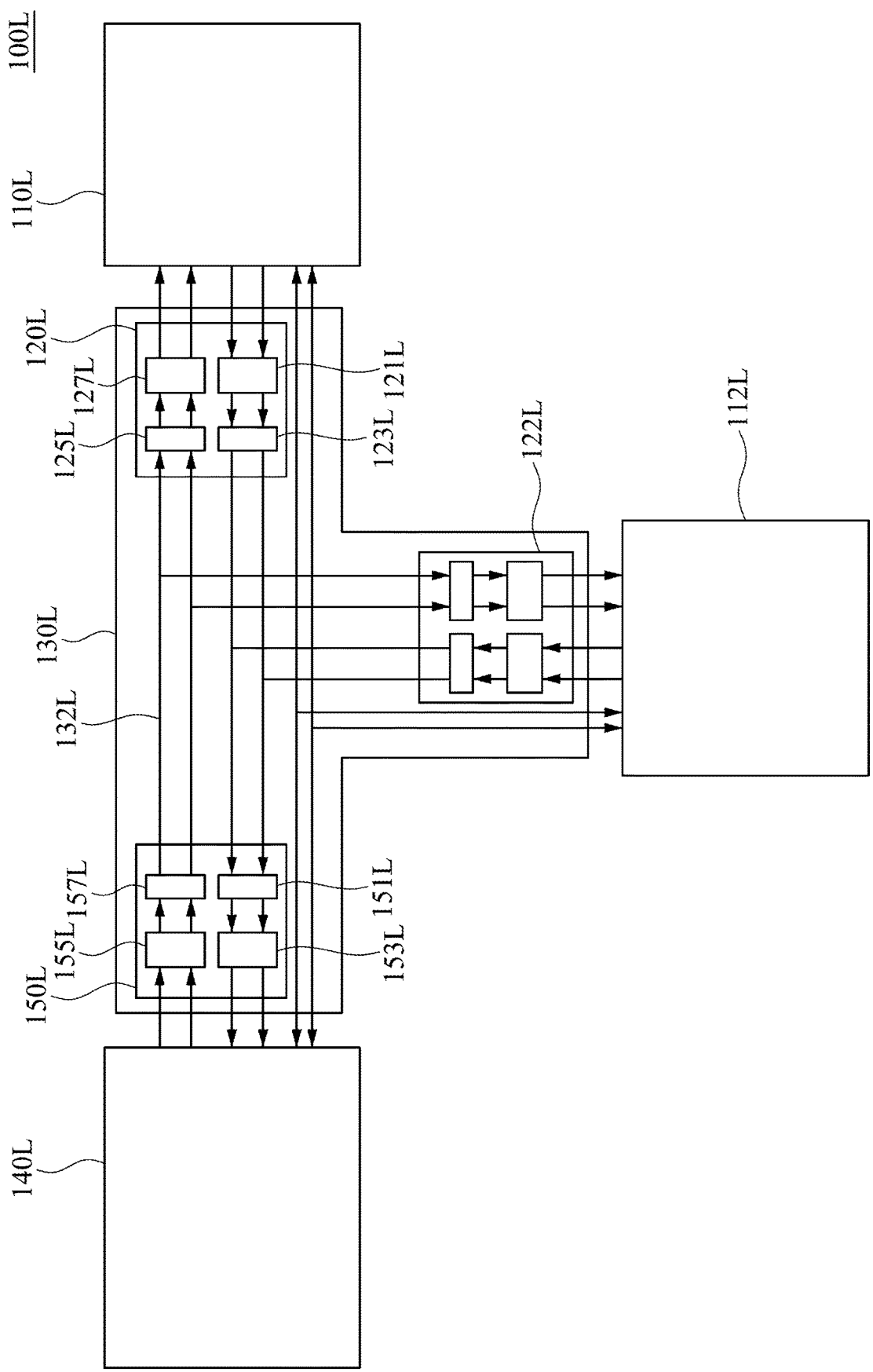
FIG. 15 depicts a schematic diagram of a data transmission system according to one embodiment of the present disclosure.

FIG. 15 depicts a schematic diagram of a data transmission system 100L according to one embodiment of the present disclosure. Compared with the data transmission system 100 shown in FIG. 2, the data transmission system 100L in FIG. 15 further includes an antenna device 112L and a conversion device 122L.

As shown in the figure, the antenna device 110L is connected to a first connecting terminal (e.g., the right terminal in the figure) of the flexible printed circuit board 130L, and the antenna device 112L is connected to a second connecting terminal (e.g., the lower terminal in the figure) of the flexible printed circuit board 130L. In addition, the signal processing device 140L is connected to a third connecting terminal (e.g., the left terminal in the figure) of the flexible printed circuit board 130L.

In one embodiment, the signal processing device 140L can be connected to the antenna device 110L and the antenna device 112L through the same optical path 132L of the optical waveguide layer by a beam splitting manner. It is noted that, the data transmission system 100L of the present disclosure can perform a bidirectional transmission through the optical path of the optical waveguide layer. In addition, the element in FIG. 15, whose symbol is similar to the symbol of the element in FIG. 2, has similar structure feature in connection with the element in FIG. 2. Therefore, a detail description regarding the structure feature of the element in FIG. 15 is omitted herein for the sake of brevity. Furthermore, the present disclosure is not limited to the structure as shown in FIG. 15, and it is merely an example for illustrating one of the implements of the present disclosure.

Figure 16:
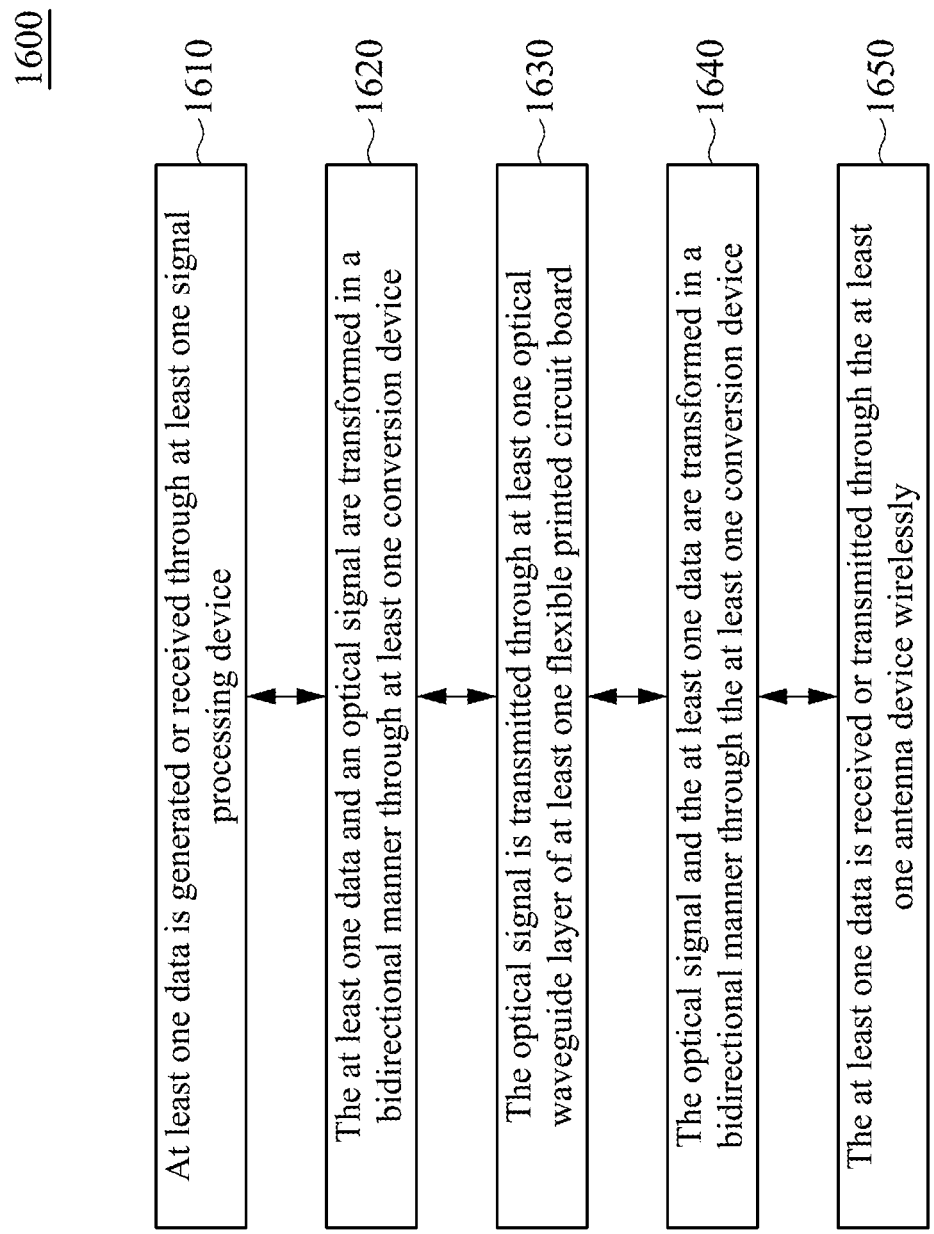
FIG. 16 depicts a flowchart of a data transmission method according to one embodiment of the present disclosure.

FIG. 16 depicts a flowchart of a data transmission method 1600 according to one embodiment of the present disclosure. As shown in the figure, the data transmission method 1600 includes the following steps. In step 1610, at least one data is generated or received through at least one signal processing device. In step 1620, the at least one data and an optical signal are transformed in a bidirectional manner through at least one conversion device. In step 1630, the optical signal is transmitted through at least one optical waveguide layer of at least one flexible printed circuit board. In step 1640, the optical signal and the at least one data are transformed in a bidirectional manner through the at least one conversion device. In step 1650, the at least one data is received or transmitted through the at least one antenna device wirelessly.

For facilitating the understanding of the data transmission method 1600 shown in FIG. 16, reference is now made to FIG. 2. In step 1610, the signal processing device 140 generates data, and transmits it to the driver 155 of the conversion device 150. In step 1620, the driver 155 of the conversion device 150 drives the photoelectric converter 157 to transform the data into an optical signal. Subsequently, the photoelectric converter 157 of the conversion device 150 transmits the optical signal to the optical waveguide layer 133.

In step 1630, the optical waveguide layer 133 of the flexible printed circuit board 130 transmits the optical signal. In step 1640, the optical detector 125 of the conversion device 120 detects the optical signal, and transforms it into the data. The amplifier 127 of the conversion device 120 adjusts the data, and transmits it to the antenna device 110. In step 1650, the antenna device 110 transmits the data wirelessly. However, the data transmission method 1600 of the present disclosure is not limited to the above-mentioned embodiments, and it is merely an example for illustrating one of the implements of the present disclosure.

In addition, the data transmission method 1600 of the present disclosure can perform a bidirectional transmission. For example, another transmission direction of the present disclosure will be described below. In step 1650, the antenna device 110 can be used to receive data wirelessly, and transmit it to the driver 121 of the conversion device 120. In step 1640, the driver 121 of the conversion device 120 can be used to drive the photoelectric converter 123 to transform the data into an optical signal. Subsequently, the photoelectric converter 123 of the conversion device 120 transmits the optical signal to the optical waveguide layer 133.

In step 1630, the optical waveguide layer 133 of the flexible printed circuit board 130 can be used to transmit the optical signal. In step 1620, the optical detector 151 of the conversion device 150 can be used to detect the optical signal, and transform it into the data. The amplifier 153 of the conversion device 150 adjusts the data, and transmits it to the signal processing device 140. In step 1610, the signal processing device 140 can be used to receive the data, and perform subsequent data-related processing on the data.

As may be appreciated by persons having ordinary skill in the art, the steps of the data transmission method 1600 are named according to the function they perform, and such naming is provided to facilitate the understanding of the present disclosure but not to limit the steps. Combining the steps into a single step or dividing any one of the steps into multiple steps, switching any step so as to be a part of another step, or adjusting the sequence of the steps falls within the scope of the embodiments of the present disclosure.

In some embodiments, for different dispositions of the flexible printed circuit board, the data transmission method 1600 includes different embodiments as shown below. In one embodiment, referring to FIG. 3, the steps of the data transmission method 1600 are described below. In step 1610, the baseband processor 141 of the signal processing device 140 can be used to generate or receive data, and process the data. For example, the baseband processor 141 is configured to modulate or demodulate the data. In addition, in step 1650, the wireless transceiver 115 of the antenna device 110 can be used to perform a RF signal processing to the data so as to generate the data in a form of RF signal. The front-end signal processor 113 of the antenna device 110 can be used to perform a front-end processing to the data in the form of RF signal. Then, the antenna 111 of the antenna device 110 can be used to receive or transmit the data in the form of RF signal wirelessly. For example, in step 1650, the wireless transceiver 115 can be used to transform between data and RF signal. The front-end signal processor 113 can be used to perform a front-end processing to the RF signal, and transmit the processed RF signal to the antenna 111. The antenna 111 receives or transmits the RF signal wirelessly. In addition, the RF signal processing performed by the wireless transceiver 115 can be RF signal processing, converting, and digitization (and vice-versa). Besides, the front-end processing performed by the front-end signal processor 113 can be filtering data, amplifying data, transforming data, and so on.

In another embodiment, referring to FIG. 4, the steps of the data transmission method 1600 are described below. In step 1610, the baseband processor 141A of the signal processing device 140A can be used to generate data. The wireless transceiver 143A of the signal processing device 140A can be used to perform a RF signal processing to the data. In addition, in step 1650, the front-end signal processor 113A of the antenna device 110A can be used to perform a front-end processing to the data. Then, the antenna 111A of the antenna device 110A can be used to receive or transmit the data wirelessly.

In still another embodiment, referring to FIG. 5, the steps of the data transmission method 1600 are described below. In step 1610, the baseband processor 141B of the signal processing device 140B can be used to generate data. The wireless transceiver 143B of the signal processing device 140B can be used to perform a RF signal processing to the data. Then, the front-end signal processor 145B of the signal processing device 140B can be used to perform a front-end processing to the data. In addition, in step 1650, the antenna 111B of the antenna device 110B can be used to receive or transmit the data wirelessly.

It can be understood from the embodiments of the present disclosure that application of the present disclosure has the following advantages. The data transmission system and the data transmission method of the present disclosure adopt a flexible printed circuit to transmit signals with high speed so as to enhance data transmission speed, such that the transmission bandwidth can be increased, and the interference can be decreased. If the data transmission system and the data transmission method of the present disclosure are applied to electronical products, it will bring a fast/quick response experience to users.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission system, comprising:
   at least one signal processing device, configured to generate or receive at least one data;
   at least one conversion device, configured to transform between the at least one data and an optical signal;
   at least one antenna device, configured to obtain the at least one data according to the optical signal, and configured to receive or transmit the at least one data wirelessly; and
   at least one integrated optoelectronics flexible printed circuit, configured to transmit the optical signal and at least one electrical signal;
   wherein the at least one integrated optoelectronics flexible printed circuit is connected between the at least one signal processing device and the at least one antenna device.

2. The data transmission system of claim 1, wherein at least one conductive layer of the at least one integrated optoelectronics flexible printed circuit is configured to transmit at least one electrical signal between the at least one signal processing device and the at least one antenna device.

3. The data transmission system of claim 1, wherein the at least one antenna device comprises:
   a wireless transceiver, configured to perform RF signal processing to the at least one data so as to generate the at least one data in a form of RF signal;
   a front-end signal processor, configured to perform front-end processing to the at least one data in the form of RF signal; and
   an antenna, configured to receive or transmit the at least one data in the form of RF signal wirelessly.

4. The data transmission system of claim 3, wherein the at least one signal processing device comprises:
   a baseband processor, configured to generate or receive the at least one data.

5. The data transmission system of claim 1, wherein the at least one antenna device comprises:
   a front-end signal processor, configured to perform front-end processing to the at least one data; and
   an antenna, configured to receive or transmit the at least one data wirelessly.

6. The data transmission system of claim 5, wherein the at least one signal processing device comprises:
   a baseband processor, configured to generate or receive the at least one data; and
   a wireless transceiver, configured to perform RF signal processing to the at least one data.

7. The data transmission system of claim 1, wherein the at least one antenna device comprises:
   an antenna, configured to receive or transmit the at least one data wirelessly.

8. The data transmission system of claim 7, wherein the at least one signal processing device comprises:
   a baseband processor, configured to generate or receive the at least one data;

a wireless transceiver, configured to perform RF signal processing to the at least one data so as to generate the at least one data in a form of RF signal; and a front-end signal processor, configured to perform front-end processing to the at least one data in the form of RF signal.

9. The data transmission system of claim 1, wherein the at least one conversion device comprises:

a first conversion device, connected between the at least one antenna device and the at least one integrated optoelectronics flexible printed circuit, configured to transform between the data and the optical signal, and configured to transmit the optical signal through at least one optical waveguide layer of the at least one integrated optoelectronics flexible printed circuit; and a second conversion device, connected between the at least one integrated optoelectronics flexible printed circuit and the at least one signal processing device, and configured to transform between the optical signal and the data, wherein the data is processed by the at least one signal processing device.

10. The data transmission system of claim 1, wherein the at least one conversion device comprises:

a photoelectric converter, disposed on the at least one integrated optoelectronics flexible printed circuit; and an optical detector, disposed on the at least one integrated optoelectronics flexible printed circuit.

11. The data transmission system of claim 10, wherein the at least one conversion device further comprises:

a driver, internally installed in the at least one signal processing device or the at least one antenna device; and an amplifier, internally installed in the at least one signal processing device or the at least one antenna device.

12. The data transmission system of claim 1, wherein the at least one conversion device is internally installed in the at least one signal processing device or the at least one antenna device.

13. The data transmission system of claim 1, wherein the at least one signal processing device, the at least one conversion device, and the at least one antenna device are disposed on the at least one integrated optoelectronics flexible printed circuit.

14. The data transmission system of claim 13, further comprising:

a first support plate, located below the at least one integrated optoelectronics flexible printed circuit, and configured to support the at least one antenna device; and a second support plate, located below the at least one integrated optoelectronics flexible printed circuit, and configured to support the at least one signal processing device.

15. The data transmission system of claim 1, wherein the at least one conversion device and the at least one antenna device are disposed on the at least one integrated optoelectronics flexible printed circuit.

16. The data transmission system of claim 15, further comprising:

a support plate, located below the at least one integrated optoelectronics flexible printed circuit, and configured to support the at least one antenna device; and a substrate, connected to the at least one integrated optoelectronics flexible printed circuit, and configured to dispose the at least one signal processing device.

17. The data transmission system of claim 1, wherein the at least one signal processing device and the at least one conversion device are disposed on the at least one integrated optoelectronic flexible printed circuit.

18. The data transmission system of claim 17, further comprising:

a substrate, connected to the at least one integrated optoelectronics flexible printed circuit, and configured to dispose the at least one antenna device;

a support plate, located below the at least one integrated optoelectronics flexible printed circuit, and configured to support the at least one signal processing device.

19. The data transmission system of claim 1, wherein the at least one conversion device is disposed on the at least one integrated optoelectronics flexible printed circuit.

20. The data transmission system of claim 19, further comprising:

a first substrate, connected to the at least one integrated optoelectronics flexible printed circuit, and configured to dispose the at least one signal processing device; and a second substrate, connected to the at least one integrated optoelectronics flexible printed circuit, and configured to dispose the at least one antenna device.

21. The data transmission system of claim 1, wherein the at least one antenna device comprises:

a first antenna device, connected to a first connecting terminal of the at least one integrated optoelectronics flexible printed circuit; and a second antenna device, connected to a second connecting terminal of the at least one integrated optoelectronics flexible printed circuit;

wherein the at least one signal processing device is connected to a third connecting terminal of the at least one integrated optoelectronics flexible printed circuit.

22. The data transmission system of claim 21, wherein the at least one signal processing device is coupled to the first antenna device through a first optical path of at least one optical waveguide layer of the at least one integrated optoelectronics flexible printed circuit, and the at least one signal processing device is coupled to the second antenna device through a second optical path of the at least one optical waveguide layer.

23. The data transmission system of claim 21, wherein the at least one signal processing device is coupled to the first antenna device and the second antenna device through a same optical path of at least one optical waveguide layer of the at least one integrated optoelectronics flexible printed circuit.

24. A data transmission method, applied to a data transmission system, wherein the data transmission system includes at least one signal processing device, at least one conversion device, at least one antenna device, and at least one integrated optoelectronics flexible printed circuit, wherein the at least one integrated optoelectronics flexible printed circuit is connected between the at least one signal processing device and the at least one antenna device, and the data transmission method comprises:

generating or receiving at least one data through the at least one signal processing device;

transforming between the at least one data and an optical signal through the at least one conversion device;

transmitting the optical signal through at least one optical waveguide layer of the at least one integrated optoelectronics flexible printed circuit;

transforming between the optical signal and the at least one data through the at least one conversion device; and receiving or transmitting the at least one data through the at least one antenna device wirelessly.

25. The data transmission method of claim 24, wherein generating or receiving the at least one data through the at least one signal processing device comprises:
 generating or receiving the at least one data through a baseband processor of the at least one signal processing device.

26. The data transmission method of claim 25, wherein receiving or transmitting the at least one data through the at least one antenna device wirelessly comprises:
 performing RF signal processing to the at least one data through a wireless transceiver of the at least one antenna device so as to generate the at least one data in a form of RF signal;
 performing front-end processing to the at least one data in the form of RF signal through a front-end signal processor of the at least one antenna device; and
 receiving or transmitting the at least one data in the form of RF signal through an antenna of the at least one antenna device wirelessly.

27. The data transmission method of claim 24, wherein generating or receiving the at least one data through the at least one signal processing device comprises:
 generating or receiving the at least one data through a baseband processor of the at least one signal processing device; and
 performing RF signal processing to the at least one data through a wireless transceiver of the at least one signal processing device so as to generate the at least one data in a form of RF signal.

28. The data transmission method of claim 27, wherein receiving or transmitting the at least one data through the at least one antenna device wirelessly comprises:
 performing front-end processing to the at least one data in the form of RF signal through a front-end signal processor of the at least one antenna device; and
 receiving or transmitting the at least one data in the form of RF signal through an antenna of the at least one antenna device wirelessly.

29. The data transmission method of claim 24, wherein generating or receiving the at least one data through the at least one signal processing device comprises:
 generating or receiving the at least one data through a baseband processor of the at least one signal processing device;
 performing RF signal processing to the at least one data through a wireless transceiver of the at least one signal processing device so as to generate the at least one data in a form of RF signal; and
 performing front-end processing to the at least one data in the form of RF signal through a front-end signal processor of the at least one signal processing device.

30. The data transmission method of claim 29, wherein receiving or transmitting the at least one data through the at least one antenna device wirelessly comprises:
 receiving or transmitting the at least one data in the form of RF signal through an antenna of the at least one antenna device wirelessly.

* * * * *